US006801197B2

(12) United States Patent
Sanstrom

(10) Patent No.: US 6,801,197 B2
(45) Date of Patent: Oct. 5, 2004

(54) SYSTEM AND METHOD FOR ATTACHING DRILLING INFORMATION TO THREE-DIMENSIONAL VISUALIZATIONS OF EARTH MODELS

(75) Inventor: William C. Sanstrom, Cypress, TX (US)

(73) Assignee: Landmark Graphics Corporation, Houston, TX (US)

( * ) Notice: Subject to any disclaimer, the term of this patent is extended or adjusted under 35 U.S.C. 154(b) by 352 days.

(21) Appl. No.: 09/947,297

(22) Filed: Sep. 6, 2001

(65) Prior Publication Data

US 2002/0050989 A1 May 2, 2002

Related U.S. Application Data

(60) Provisional application No. 60/231,159, filed on Sep. 8, 2000.

(51) Int. Cl.$^7$ ................................................. G06T 15/00
(52) U.S. Cl. ........................................ 345/419; 367/25
(58) Field of Search ............................... 345/418, 419; 367/25, 81, 82, 83

(56) References Cited

U.S. PATENT DOCUMENTS

| 25,692 | A | * | 10/1859 | Lu et al. ..................... | 112/157 |
| 103,630 | A | * | 5/1870 | Aldred et al. ............... | 114/180 |
| 6,191,787 | B1 | * | 2/2001 | Lu et al. ..................... | 345/418 |
| 6,373,489 | B1 | * | 4/2002 | Lu et al. ..................... | 345/428 |
| 6,388,947 | B1 | * | 5/2002 | Washbourne et al. ......... | 367/73 |

FOREIGN PATENT DOCUMENTS

EP 0 965 925 12/1999

OTHER PUBLICATIONS

Marshall, G. et al., "Relevant time update of an Earth model with logging while drilling data", Proceedings 2000 SPE Annual Technical Conference and Exhibition—Production Operations and Engineering General; Dallas, TX, Oct. 1–Oct. 4, 2000, vol. PI, 2000, pp. 1–5 XP002194710.

Guerrero, J. Victor, "Taking advantage of 3–dimensional visualization in drilling operations", Proceedings of the 1997 SPE Annual Technical Conference and Exhibition, Part Delta; San Antonio, TX, Oct. 5–8, 1997, vol. Delta, 1997, pp. 759–764, XP002194711.

Aldred, W.D., "Improving Drilling Efficiency Through the Application of PERFORM, Performance by Risk Management", Proceedings of the 1999 SPE/IADC Annual Technical Conference and Exhibition, Nov. 8–10, 1999, pp. 1–14, XP002194712.

* cited by examiner

Primary Examiner—Don Wong
Assistant Examiner—Huedung X. Cao
(74) Attorney, Agent, or Firm—Meyertons Hood Kivlin Kowert & Goetzel, P.C.

(57) ABSTRACT

A system and method for perceiving drilling learning through visualization is provided. In one embodiment using three-dimensional visualization of the earth model as a foundation, a new IT development strategy focuses on perceiving "Drilling Learning" by an intuitive method. Symbols, known as "Knowledge Attachments" are attached to each wellbore trajectory displayed in the three-dimensional environment, with each symbol indicating a specific event—such as one related to drilling operations or problems. A Knowledge Attachment system proves particularly useful to represent disparate data at once, in such a manner that the interdependencies between the earth model and drilling operational data are evident and correlated. Operational issues and lessons learned from prior wells are easily accessed and perceived in the context of the earth model. By understanding this information at the beginning of the well planning process, operational efficiencies may be improved.

20 Claims, 5 Drawing Sheets

SYSTEM AND METHOD FOR ATTACHING DRILLING INFORMATION TO THREE-DIMENSIONAL VISUALIZATIONS OF EARTH MODELS

PRIORITY DATA

This application claims benefit of priority of provisional application Ser. No. 60/231,159 titled "System And Method For Attaching Drilling Information To Three-Dimensional Visualizations Of Earth Models" filed Sep. 8, 2000 whose inventor is William C. Sanstrom.

FIELD OF THE INVENTION

The present invention generally relates to computer-based display of oil and gas exploration and production data. More particularly, the present invention relates to coupling drilling operational events and knowledge with an earth model in three-dimensional computer displays.

DESCRIPTION OF THE RELATED ART

During the last 20 years, the Exploration and Production (E&P) business has been very successful in reducing the costs of finding and producing oil and gas reserves. However, it faces challenges to profitability in years to come. With the E&P industry competing for the same investment dollars as other industries, it is essential that operating companies continue to maximize the rate of return to their shareholders.

E&P companies are now putting more focus on collaborative asset teamwork to better evaluate the economic viability and risk involved in developing prospective oil and gas fields. To facilitate such collaboration, E&P companies are adopting shared, integrated, IT technology to enable multi-disciplinary teams to engage in improved workflow processes across all phases of the oil field life cycle.

Traditionally, Geoscientists have had the benefit of powerful integrated visualization tools. Such applications are characterized by excellent integration and interoperability, allowing workflow practices to be optimized. This permits geologists and geophysicists to model and comprehend the nature of the subsurface environment when evaluating prospects and planning development projects.

Drilling engineers tasked with wellbore construction typically do not utilize these integrated applications. The earth model resulting from the explorationists' use of their tools is rarely referenced directly by the drilling engineer. The chasm between the explorationist and driller hinders optimum wellbore construction planning and execution, but presents a significant opportunity for operational improvement.

SUMMARY OF THE INVENTION

One embodiment of the present invention comprises a system and method for coupling drilling operational knowledge with an earth model in three-dimensional computer displays. The method may operate in a computer system comprising a processor and a memory medium. The memory medium may store a software program according to one embodiment of the present invention. The processor may execute the software program to 1) display a three-dimensional representation of an earth model of one or more wells; and 2) display one or more knowledge attachment symbols on the three-dimensional representation, wherein each knowledge attachment symbol is configured to display drilling operations data associated with the knowledge attachment symbol in response to user input.

As previously stated, the chasm between the explorationist and driller presents a significant opportunity for operational improvement. Coupling drilling operational events and knowledge (contained within Drilling Information Management Systems (DIMS)) with the earth model is a significant operational improvement that may be made to lessen the chasm. With the advent of more powerful personal computers and laptops, drilling engineers may now access similar visualization tools geoscientists have traditionally used on computer systems such as UNIX workstations.

Using three-dimensional visualization of the earth model as a foundation, a new Information Technology (IT) development strategy focuses on perceiving "Drilling Learning" by an intuitive method. Symbols, known as "Knowledge Attachments" may be attached to wellbore trajectories displayed in a three-dimensional environment, with each symbol indicating a specific event, such as one related to drilling operations or problems. This method may prove particularly useful to represent this disparate data together in one user interface, and in such a manner that the interdependencies between the earth model and drilling operations data are evident and correlated.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE EMBODIMENTS

The following documents are hereby incorporated by reference in their entirety as though fully and completely set forth herein:

Foley, J. and Ribarsky, B.: "Next Generation data visualization Tools", Georgia Institute of Technology, USA. (1994).

Dent, H.: "The Roaring 2000s", Simon & Schuster, New York (1998).

Yu, A.: "Creating the Digital Future", The Free Press, New York (1998).

Figure 1:
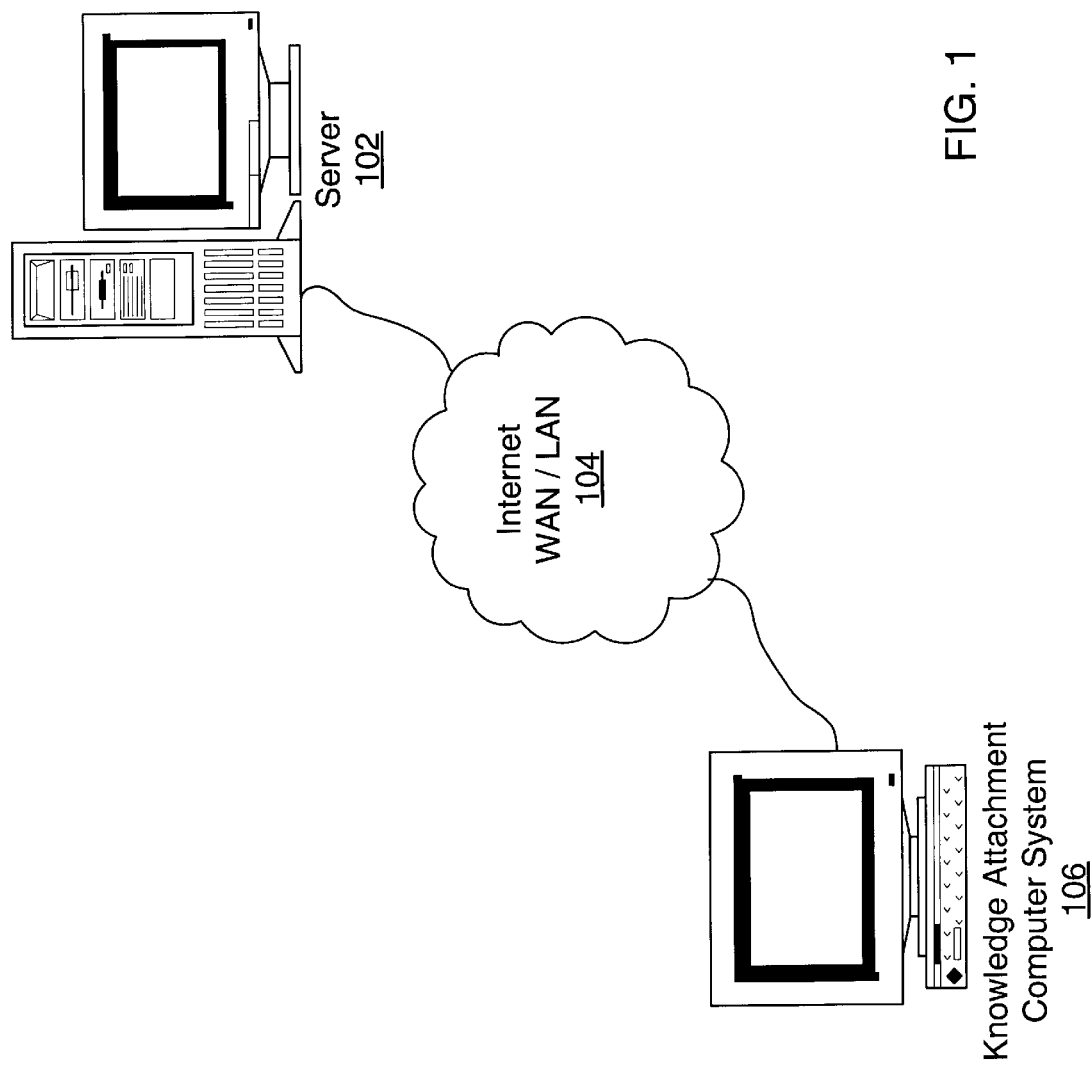
FIG. 1 illustrates a network system according to one embodiment.

FIG. 1: Network System

FIG. 1 illustrates a simplified and exemplary network system according to one embodiment of the present invention. The embodiment illustrated in FIG. 1 includes one server 102 and one Knowledge Attachment computer system 106, which may be connected to a network 104 such as the Internet. However, it is noted that the present invention may be utilized with respect to any number of servers 102 and systems 106.

As shown, the server 102 may be connected to a network 104, in one embodiment the Internet 104. The Internet 104 is currently the primary mechanism for information interchange. However, the present invention may be used with any of various types of wide-area networks, or networks of networks, such as the Internet, which connects computers and networks of computers together, thereby providing the connectivity for enabling communication and information exchange. Thus, the network 104 may be any of various types of networks, including local and/or wide area networks, and including wired and wireless networks, or combinations thereof.

Knowledge Attachment system 106 may also be connected to the Internet 104. The Knowledge Attachment system 106 may be of various kinds of systems such as a desktop computer system, a notebook computer system, a workstation, etc. The system 106 may execute web browser, network-based database access, and other network software for allowing a user of the system 106 to browse and/or search the Internet 104, as well as enabling transactions over the Internet 104 such as database queries. The network connection software may use 3-D visualization and other software executing within the Knowledge Attachment system 106 to access various E&P data such as earth model, wellbore trajectory, and Knowledge Attachment data stored in databases on one or more servers 102. This information may be used to provide a 3D visualization of the earth model and to create and display Knowledge Attachments for various features of the earth model.

When the user of the system 106 desires to access detailed information for a Knowledge Attachment, the network software may accesses one or more servers 102 to retrieve the detailed information. For example, the system 106 may access a web page of the server 102.

The server 102 and/or system 106 may include various standard components such as one or more processors or central processing units, one or more memory media, and other standard components, e.g., a display device, input devices, a power supply, etc. The server 102 and/or system 106 may also be implemented as two or more different computer systems.

A server may be defined as a computer or computer program that, when executed, provides services to other computer programs executing in the same or other computer systems. The computer system on which a server program is executing may also be referred to as a server, though it may contain a number of server and client programs. In the client/server model, a server is a program that awaits and fulfills requests from client programs in the same or other computer systems.

The Knowledge Attachment system 106 preferably includes a memory medium on which computer programs according to the present invention are stored. The term "memory medium" is intended to include various types of memory or storage, including an installation medium, e.g., a CD-ROM, or floppy disks, a computer system memory or random access memory, e.g., a random access memory (RAM), such as DRAM, SRAM, EDO RAM, Rambus RAM, etc., or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network. In the latter instance, the second computer provides the program instructions to the first computer for execution. In addition, the server 102 and/or system 106 may take various forms, including a computer system, mainframe computer system, workstation, or other device. In general, the term "computer system" or "server" can be broadly defined to encompass any device having a processor that executes instructions from a memory medium.

The memory medium preferably stores software for enabling the displaying of symbols, referred to as Knowledge Attachments, attached to a wellbore trajectory displayed in a three-dimensional environment, with each symbol indicating a specific event, according to the methods or flowcharts described below. The software program may be implemented in any of various ways, including procedure-based techniques, component-based techniques, and/or object-oriented techniques, among others. For example, the software program may be implemented using ActiveX controls, C++ objects, Java objects, Microsoft Foundation Classes (MFC), or other technologies or methodologies, as desired. A CPU, such as the host CPU, executing code and data from a memory medium comprises a means for coupling drilling operational knowledge with an earth model in three-dimensional computer displays according to the methods, flowcharts or screen shots described below.

In another embodiment, Knowledge Attachment system 106 may be a standalone system, not connected to a network 104 or to a server 102. In this embodiment, the Knowledge Attachment System 106 may include all required databases to generate the 3D visualization with Knowledge Attachments. In yet another embodiment, server 102 and system 106 may be directly connected instead of connected through a network 104.

Various embodiments further include receiving or storing instructions and/or data implemented in accordance with the foregoing description upon a carrier medium. Suitable carrier media include memory media or storage media such as magnetic or optical media, e.g., disk or CD-ROM, as well as signals such as electrical, electromagnetic, or digital signals, conveyed via a communication medium such as networks and/or a wireless link.

Perceiving Drilling Learning through Visualization

For the purposes of this application, a definition of visualization may include the concept of binding (or mapping) of data to a representation that can be perceived. At a high level, the data being bound is that of an earth model and Drilling Information Management Systems (DIMS) operational data. An earth model may be defined as a spatial model of the earth surface and subsurface, containing a network of earth model objects, such as rock and fluid bodies. In one embodiment, an earth model may be generated in a project data environment, e.g. the integrated OpenWorks project data environment. Integration of the data from these different sources in the same visualizations may enable visual analysis. This system may prove particularly useful in representing this disparate data at once, in such a manner that the interdependencies can be made clear. The interactive data binding coupled with the 3-dimensional (3D) display will greatly enhance the ability to analyze these complex data sets and speed up the process of extracting information.

For visual analysis, it is desirable that the tools for accessing and filtering the data be tightly integrated with the visualization environment. When working in a team environment, visual analysis may provide, but is not limited to, the following benefits:

speeds communication
    conveys subtlety
    builds trust
    promotes creativity
    speeds and enhances decision making Embodiments of the invention may provide integrated well planning, where powerful, three-dimensional visualization tools allow the geologists and geophysicists to collaborate more closely with the drilling engineers at the very early stages of prospect assessment and well design. Embodiments of the invention may also reduce the overall interpretation and planning cycle time.

Further advances in information technology (IT) are promoting close asset team collaboration to extend from the well planning process in the office to the well construction operations in the field. Embodiments of the invention may merge Earth Model information, offset well drilling histories, and data gathered in real-time from mud-logging sensors and Measurement While Drilling (MWD) and Logging While Drilling (LWD) tools into one integrated work environment. Embodiments of the invention may include a shared, three-dimensional view of the subsurface Earth Model, both at the well site and in the office, against which both planned and actual drilling information is displayed. Embodiments of the invention may include the capability for the geologists and geophysicists to compare the planned Earth Model with actual down-hole log data and to transmit a reinterpreted model back to the field when required. For the drilling engineers in the office and the drilling supervisors at the well site, embodiments of the invention may provide a continuous visualization of the sub-surface environment that allows closer monitoring of actual drilling progress and better contingency planning for expected problem areas.

With such a wealth of well planning and well construction information now available to the asset team in one integrated environment, embodiments of the invention may provide methods to compare the information from the various, disparate data sources and to determine the interdependencies between the complex data sets. For example, this may be beneficial when assessing the viability of new well designs in an existing field development. Embodiments of the invention may provide additional tools that allow the asset team to rapidly deduce "lessons learnt" from previous wells, and to incorporate this learning into future well design and operations.

Embodiments of the invention may enable the access of DIMS information and facilitate the capture of "drilling learning" through visualization of the earth model. Embodiments may include data management systems for the earth model and drilling information. Examples of such database management systems are OpenWorks for the earth model and DIMS for the drilling information. Some embodiments of a system for perceiving drilling learning through visualization may also include a 3D visualizer that may integrate the two data sources utilizing Knowledge Attachments. In one embodiment, a Windows NT-based 3D visualizer may be used. In some embodiments, the 3D visualizer may be integrated with a project data environment, e.g. the integrated OpenWorks project data environment, providing 3D views of the earth model. In some embodiments, the viewer may also be an part of a 3D system, e.g. a real-time drilling and reservoir solution such as the RESolution 3D system, which may provide a real-time link between a project data environment, e.g. the integrated OpenWorks project data environment, and a rig information system, e.g. Sperry-Sun's InSite system.

Using earth model visualization as a foundation, embodiments of the invention may allow the capturing "drilling learning" by an intuitive method. In one embodiment, symbols, known as "Knowledge Attachments", may be attached to each wellbore trajectory displayed in the three-dimensional environment to indicate a specific event, such as one related to drilling operations. Knowledge Attachments may be displayed on a wellbore trajectory in the 3-dimensional earth model that is bound to drilling operations data. The drilling operations data is accessed and filtered using database queries. A wellbore may be defined as a unique, oriented hole from the intended bottom of a drilled interval to the surface of the Earth. If more than one path exists from a wellbore bottom point to a surface point, then more than one wellbore exists. The wellbore provides a conduit for operations within a well.

In one embodiment, the visual appearance of the Knowledge Attachment may depend on the type or category of underlying information, e.g. DIMS information, to which it is bound. For example, a red asterisk might be chosen as the display symbol to indicate a stuck-pipe event at a certain measured depth. In some embodiments, each Knowledge Attachment may include multiple levels of information. In one embodiment, each Knowledge Attachment may include two levels of information: summary and detailed. In this embodiment, clicking on the symbol may display the summary information. The summary view may be represented much like a post-it note when the symbol is clicked. The post-it type display may include an area for displaying and/or entering free formatted text. The well name and Knowledge Attachment depth may also be displayed in the summary. Links to any detailed content available may also be displayed in the summary view. The detailed content may be in any of several forms, including, but not limited to: documents (files), web links (URLs), or a direct link to database information such as related drilling database information. In one embodiment, the appearance and underlying data source of the Knowledge Attachment may be configurable on a site and user basis.

A benefit of this approach to visualizing data may be the speed of accessibility to the more valuable information captured on previous wells. This may allow drilling engineers and the other asset team members to better assess technical risk from the outset of prospect development and well planning, and to manage the risk more effectively.

Definition of Standard Symbols.

A standard set of Knowledge Attachment display symbols may be provided so that information can be visually correlated with certainty of what it represents. The visual appearance of each Knowledge Attachment is dependent on the type (or category) of information to which it is bound. In one embodiment, the appearance and underlying data source of the Knowledge Attachment may be configurable on a site basis. For example, a red asterisk may represent a lost circulation event, while a yellow circle may represent an occurrence of stuck pipe. In one embodiment, a standard library of symbols may be provided. In one embodiment, user defined symbols may be created, e.g. for unique circumstances.

Information Content of Knowledge Attachments.

Figure 2:
FIG. 2 is a screenshot of an earth model with wellbore trajectory and associated Knowledge Attachments according to one embodiment.
Figure 3:
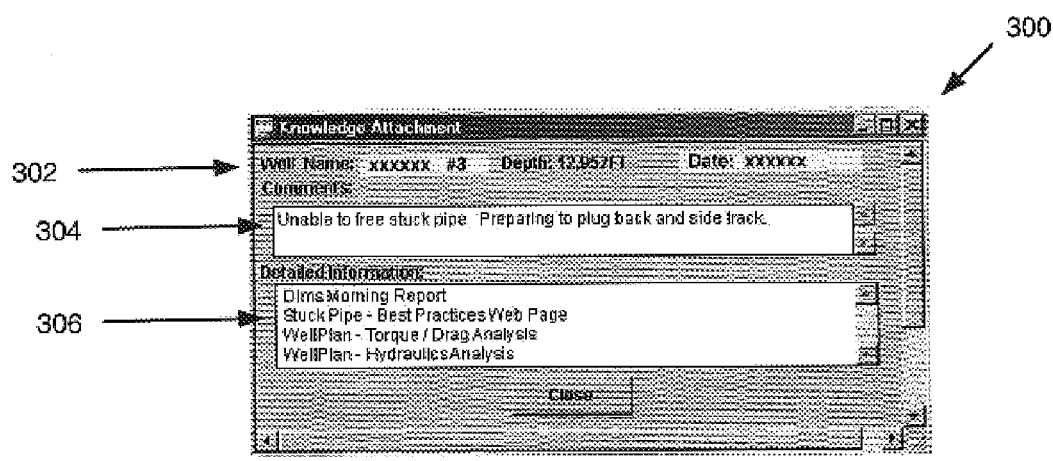
FIG. 3 is a screenshot of a Knowledge Attachment display according to one embodiment.
Figure 4:
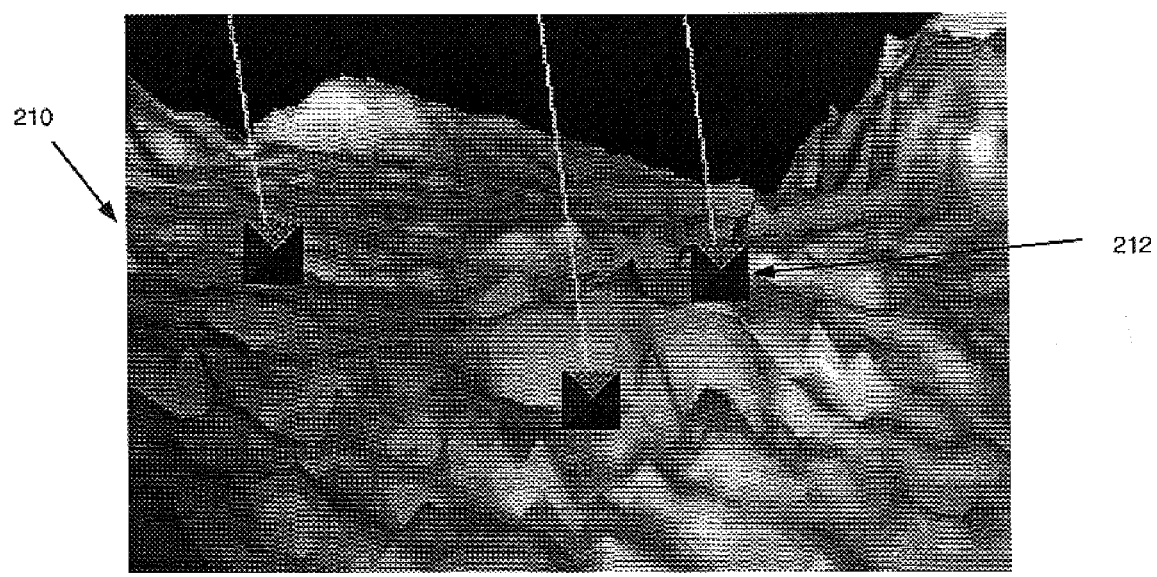
FIG. 4 is a screenshot of another example of an earth model with wellbore trajectory and associated Knowledge Attachments according to one embodiment.
Figure 5:
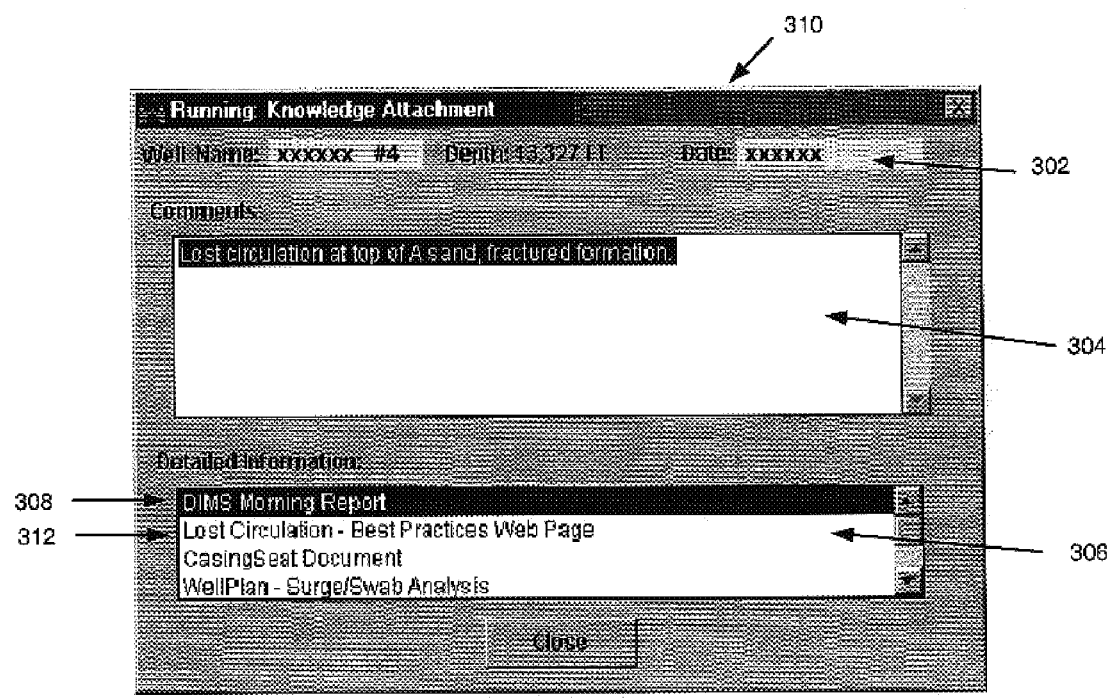
FIG. 5 is a screenshot of another example of a Knowledge Attachment display according to one embodiment.

FIGS. 3 and 5 illustrate embodiments of Knowledge Attachment displays or dialogs that include two levels of information, summary and detailed. The summary view is displayed when a symbol on a wellbore trajectory such as those illustrated in FIGS. 2 and 4 is clicked. In FIG. 3, the Knowledge Attachment display 300 may include a free-form area 304 for the user to enter pertinent comments. The well name and Knowledge Attachment depth may be displayed in the summary 302

Links to detailed content may also be displayed in the Detailed Information 306. The detailed content may be a collection of documents (files), links to web pages, morning reports, and database queries. For example, assume the Knowledge Attachment 300 represents a well control incident. Examples of information provided detailed content may include, but is not limited to: a spreadsheet with the completed kill sheet, a link to a well control best practices page on the company intranet, and a copy of the morning report. When an item in the detailed content list 306 is selected, an appropriate application may be launched to view the information.

Creation of Knowledge Attachments

Once a standard set of Knowledge Attachment types and associated symbols are defined, the appropriate data is bound to them. Knowledge Attachments may be created in one of two ways: manually or automatically.

When creating a Knowledge Attachment manually, a well, depth, and attachment type may be selected. Next, a user may provide the text for the summary, and then may create links to appropriate detailed content. Manually created Knowledge Attachments may be used in the well planning process to document operational issues or directives. They also may serve as a good communications tool for handing off information during a "hitch change".

Automatically creating Knowledge Attachments facilitates drilling learning. The appropriate drilling operations data may be associated with the symbol using database queries. A database query is constructed and associated with a Knowledge Attachment symbol. The database query is then executed against the database. The Knowledge Attachment appears in the 3D viewer in the context of the earth model. By using generic definitions (templates), a standard library of Knowledge Attachment definitions may be maintained which may be independent of the well or field. A fully defined Knowledge Attachment template may include a symbol type and the associated database query. This library may facilitate the integration and interrogation of drilling data in the earth model by making access to the data easy and intuitive. Examples of such templates include, but are not limited to:

| | |
|---|---|
| Stuck pipe | Lost Circulation |
| Bit Change | Reaming |
| Kick | High Torque |
| Hard Stringers | Packing Off |
| Tight Hole | Drilling Comments |
| Trouble Time | |

The detailed information behind the template may be bound to the Knowledge Attachment when the well(s) or field is rendered in the visualization environment. Embodiments of the invention enable identifying this information and then correlating it among large numbers of wells, and facilitates the creation of better well designs and improved operational efficiency by learning from prior experiences.

Examples of Knowledge Attachments

FIGS. 2 and 4 illustrate examples of 3D views of wellbore trajectories with symbols representing Knowledge Attachments according to embodiments of the invention. Knowledge Attachments may be used to improve many aspects of the wellbore construction process: planning, operations, and post well analysis.

An example is a field where several wells have been drilled and new wells are being planned. Early on in the well planning process, the system may be used to learn about issues encountered with existing wells in the area. New or experienced drilling engineers can easily access the historical data and view it within the earth model. The existing wells are shown in FIG. 2. In this example, a Trouble Time template is chosen, and the drilling data management system is accessed. The 3-dimensional view is automatically populated with Knowledge Attachments for all occurrences of Trouble Time for wells in the field, based on morning report information.

In FIG. 2, these Knowledge Attachments are represented by small squares and small circles used to represent drilling events on the 3D view 200. In this example, the squares 202 along the fault 204 identify High Torque areas, and the circles 206 along the horizontal horizon 208 identify Lost Circulation. By clicking on any of these Knowledge Attachments, the detailed and summary information for the selected Knowledge Attachment may be displayed as illustrated in FIG. 3, allowing further analysis. Thus, the planned well can be designed to minimize these known issues. In complex geology with subtle problems, these correlations may not be perceived without a system such as the described Knowledge Attachment system. If engineers have to filter through printed reports to access this information, it is probable that problems encountered and lessons learned from prior wells would be overlooked. The Knowledge Attachment system may be particularly useful to drilling engineers not familiar with an area.

Once the well is planned and drilling commences, the Knowledge Attachment system may continue to be of value. Offset well information can continue to be accessed and the plan refined, before trouble is encountered. Knowledge Attachments may be manually created for purposes of handing off information during a hitch change and documenting operational directives to be implemented in various sections of the well.

During the post-well analysis, the Knowledge Attachment system may be used to gather lessons learned and help improve the operational efficiency of future wells. The Knowledge Attachment system may also be a valuable training aid for new engineers.

System Components

Data Analyzer

A series of canned queries may be provided for processing that can be applied to any series of wellpaths in a project area. The queries may later be customized for customer/operations specific data. The Query results may be attributable to a well and downhole depth, and DIMS activity code (for example lost time). These queries may be stored for reuse; for example, the queries may be stored in DIMS. The extract may produce data in a column format to be accessed by the 3D visualizer. The queries may be processed "behind the scenes", and the results returned to the 3D Visualizer. A database query may extract information including, but not limited to:

Measured Depth (of TD or bit depth at time of event)

Rig Datum Reference.

Well name—has to have linkage table to OpenWorks names.

Activity Code.

Activity comments.

Date/Time.

Internal DIMS Keys for indexing (e.g. E_KEY, R_KEY, I_KEY)

3D Visualizer

Some embodiments of a system for perceiving drilling learning through visualization may also include a 3D visualizer that may integrate data sources utilizing Knowledge Attachments. In one embodiment, a Windows NT-based 3D visualizer may be used. In one embodiment, the RESolution3D Viewer may be used as the 3D visualizer. Other embodiments may utilize a Java programming language-based 3D visualizer.

Functionality

The Knowledge Attachment system may include, but is not limited to, the following functionality:

1. One or more user interface items such as button or menu/items to "Show Knowledge Attachments" or "Create Knowledge Attachment".

In general, Knowledge Attachments may be created in one of two ways, manually or automatically. When creating a Knowledge Attachment manually, the user may select a well, depth, and display symbol. Next, the user may provide the text for the summary and then may create the links to the appropriate detailed content. The links may take many forms including, but not limited to: Microsoft Office Documents, DIMS Reports, DIMS Data Analyzer Queries, iDIMS, or any Web pages.

The automatic creation of Knowledge Attachments may center on DIMS and a data analyzer. In one embodiment, the user may create a Data Analyzer Query for a set of wells and select an associated display symbol. The Query may be run and the Knowledge Attachments may be displayed on the well trajectories. For example, the user may create a Data Analyzer Query for Unplanned Time & "Stuck Pipe". A red asterisk may be chosen as the display symbol. After running the Query, all occurrences of stuck pipe are easily identifiable for the wells being visualized. The post-it may display the depth and well name and contain a link to the detailed information in DIMS. The user can then add more links if desired. Desirable links may include, but are not limited to: wireline logs, borehole images, and core photos. In one embodiment, if a file extension is registered with Windows and that file type is added as a link, then the application will start upon double clicking the link. For example, a core photo in JPEG format may be added as a link; when the user double clicks the link, the web browser (or other registered JPEG viewer) may be launched and the core photo is displayed.

2. The Dialog reads from a knowledge list and presents a list of "Drilling Attributes", for example pre-canned Data Analyzer queries stored in DIMS. Examples may include, but are not limited to:

Lost Circulation—remedial action/Pumping LCM etc.

Stuck Pipe/Jarring/Fishing/Plug Back/Ream Tight Spots/Hang-up

Well Control—Take Kick/Control Kick/Abnormal Gas

Bit Problems—Premature failure.

Downhole Equipment Failure

An attribute type may be associated with a symbol. A system configuration may define standard categories and symbols for Knowledge Attachments. Configuration may be done at the corporate level (analogous to DIMS). Standards may be defined and enforced so that symbols are not misinterpreted 3. Select an Attribute Type and the attribute symbol may be displayed on the 3D visualization associated with the well(s) of interest. As an example, "Lost Circulation" attribute 212 is shown on three wells in the 3D visualization 210 of FIG. 4. Symbols are displayed on the wellbore trajectory in 3D space bound to the DIMS data. The bound symbols are referred to as "Knowledge Attachments".

One embodiment may support the culling of symbols based on a zoom factor. In one embodiment, sections of the wellbore may be symbolized. One embodiment may support symbols for multiple symbols.

4. A user clicks on one of the symbols shown in FIG. 4 and the Knowledge Attachment dialog 310 as illustrated in FIG. 5 appears for that event for that well. Header Information 302 may display the Well Name, Depth of Interest and Date/Time. The comments 304 are the extract from the DIMS report. The comments 304 may contain information including, but not limited to:

Shift hand over

Warning information or near misses

Auto generated information from DIMS queries

In one embodiment, to relieve the user of the task of performing multiple data entry in comments 302, comments 302 may be auto populated as much as possible.

Detailed Information 306 may include links to detailed information for the Knowledge Attachment 310. Clicking on a link may access the detailed content for the link. The detailed content may include, but is not limited to: documents (files), web links (URLs), and DIMS data. The appropriate application may be started to view the detailed information (e.g. Microsoft Word, Microsoft Internet Explorer, etc.)

Knowledge Attachment 310 illustrated in FIG. 5 may include the following options. DIMS Morning report option may send an event to iDIMS to display the relevant morning report 308. Display the Best Practices Document option may automatically insert a link to a stuck pipe best practices web page 312 whenever a stuck pipe Knowledge Attachment is created. The same may occur for other Knowledge Attachment types. In some embodiments, Knowledge Attachments may be interdependent or threaded (i.e. linked Knowledge Attachments).

Embodiments of the invention may handle the conversion among the appropriate datum offsets used in different components of the Knowledge Attachment system.

Trouble Time Codes are often different between different operating companies. In some embodiments, operations codes may be identified for downhole events that can be attributed to geological features (e.g. lost circulation, stuck pipe).

Some embodiments of the invention may support the capture of depth information. This may be achieved by flagging the appropriate depth fields as mandatory.

Some embodiments may support relative depths. For example, flagging an event at a formation top plus a depth offset.

A number of activities may be associated with a single downhole event, for instance a jarring/pump slugs/fishing/plug back & sidetrack may take several days. The query, or post query tool may identify the original source of the problem. Morning report comments often deal with the 'what' happened rather than the 'why'. Some post-event activities may lead to better diagnosis of downhole problems. Fuzzy queries may be supported in some embodiments and may prove useful by using searches in the comment field for particular keywords like 'stuck, tight-spot, kick, gas, jarring, LCM, spot pill, drill blind".

On stuck pipe issues, some embodiments may allow diagnosing the cause of the sticking, be it Differential, Pack-off/Bridging or Geometry related. In addition, the stuck point may not be the bit depth, and the stuck depth may be determined from the reports i.e. free point techniques. For instance, shale expansion causes problems some time after the section has been drilled. Lost circulation or well control locations may also not be the bit depth. In one embodiment, the bit depth may be used, but the value can be changed by the user. Another embodiment may support two depth fields, such as Bit Depth and Stuck Point.

In some embodiments of a Knowledge Attachment system, if a Query that returns a depth can be structured, it can be assigned to a Knowledge Attachment. In one embodiment, the Knowledge Attachments may be attached to events, e.g. DIMS events, and thus may provide the ability to view the morning report.

Some embodiments of a Knowledge Attachment system may not have their own database but may pull data from other sources, e.g. DIMS and OpenWorks. When Knowledge Attachments are created Knowledge Attachment system, they may be stored external to the Knowledge Attachment system, for example, in a database such as OpenWorks or DIMS.

In one embodiment, the user may create queries for re-use. The user will then be able to select from a list including these reusable queries On embodiment may support the display only the data within a certain range of a given fault plane, for example, 50 meters.

One embodiment may support a data file such as a Virtual Reality Markup Language) (VRML) file that is fully portable and contains all the relevant data and links.

Some embodiments may be used to visualize BHA, bit type, casing seat and/or ROP information. This significantly widens the range of uses a drilling engineer has for such a tool. In one embodiment, ROP may be viewed as a Log Curve in the viewer. In one embodiment, a BHA change or Bit Change event can be represented as Knowledge Attachment.

Conclusion

A Knowledge Attachment system proves particularly useful to represent disparate data at once, in such a manner that the interdependencies between the earth model and drilling operational data are evident and correlated. Operational issues and lessons learned from prior wells are easily accessed and perceived in the context of the earth model. By understanding this information at the beginning of the well planning process, operational efficiencies can be improved.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method for coupling drilling operational knowledge with an earth model in three-dimensional computer displays comprising:

displaying a three-dimensional representation of an earth model of one or more wells; and displaying one or more knowledge attachment symbols on the three-dimensional representation, wherein each knowledge attachment symbol is configured to display drilling operations data associated with the knowledge attachment symbol in response to user input.

2. The method of claim 1, wherein each knowledge attachment symbol is attached to a feature in a wellbore trajectory of the earth model in the three-dimensional representation.

3. The method of claim 1, further comprising:

a user selecting a first of the one or more knowledge attachment symbols; and displaying drilling operations data associated with the first knowledge attachment symbol in a knowledge attachment display in response to said selecting.

4. The method of claim 3, wherein the knowledge attachment display includes summary information and a detailed information field.

5. The method of claim 4, wherein the summary information includes the well name, data and time information, and depth information.

6. The method of claim 4, wherein the detailed information field includes user-selectable links.

7. The method of claim 6, further comprising:

the user selecting a first detailed information link from the detailed information field;

retrieving detailed information associated with the first detailed information link in response to the user selecting a first detailed information link; and displaying the retrieved detailed information.

8. The method of claim 3, wherein the knowledge attachment display includes a comments field for receiving and displaying information entered by a user.

9. A method for coupling drilling operational knowledge with an earth model in three-dimensional computer displays comprising:

displaying a three-dimensional representation of an earth model of one or more wells; and attaching a knowledge attachment symbol to the three-dimensional representation, wherein the knowledge attachment symbol is configured to display drilling operations data associated with the knowledge attachment symbol in response to user input.

10. The method of claim 9, wherein the knowledge attachment symbol is attached to a feature in a wellbore trajectory of the earth model in the three-dimensional representation.

11. The method of claim 9, further comprising a user modifying the drilling operations data associated with the knowledge attachment symbol subsequent to said attaching.

12. A system comprising:

a first computer system comprising:
      a CPU;
      a memory; and
      a display;

wherein the memory includes program instructions executable by the CPU to:
      display on the display a three-dimensional representation of an earth model of one or more wells; and
      attach a knowledge attachment symbol to the three-dimensional representation in response to user input, wherein the knowledge attachment symbol is configured to display drilling operations data associated with the knowledge attachment symbol in response to user selection of the symbol.

13. The system of claim 12, wherein each knowledge attachment symbol is attached to a feature in a wellbore trajectory of the earth model in the three-dimensional representation.

14. A system comprising:

a first computer system comprising:
      a first CPU;
      a first memory; and
      a display;

wherein the first memory includes program instructions executable by the CPU to:
      display on the display a three-dimensional representation of an earth model of one or more wells; and
      display one or more knowledge attachment symbols on the three-dimensional representation, wherein each knowledge attachment symbol is configured to dis play drilling operations data associated with the knowledge attachment symbol in response to user input.

15. The system of claim 14, wherein each knowledge attachment symbol is attached to a feature in a wellbore trajectory of the earth model in the three-dimensional representation.

16. The system of claim 14, wherein the program instructions are further executable to:

accept user input selecting a first knowledge attachment symbol; and display drilling operations data associated with the first knowledge attachment symbol in a knowledge attachment display in response to said selecting.

17. The system of claim 16, further comprising:

a server computer system comprising a second CPU and a second memory, wherein the second memory includes the drilling operations data associated with the first knowledge attachment;

wherein, in said displaying drilling operations data associated with the first knowledge attachment symbol in a knowledge attachment display, the program instructions are further executable to retrieve the drilling operations data associated with the first knowledge attachment from the database on the server computer system.

18. The system of claim 14, further comprising:

a server computer system comprising a second CPU and a second memory, wherein the second memory includes a database including data for the earth model;

wherein, in said displaying on the display a three-dimensional representation of an earth model of one or more wells, the program instructions are further executable to retrieve the data for the earth model from the database on the server computer system.

19. A carrier medium comprising program instructions, wherein the program instructions are computer-executable to implement:

displaying a three-dimensional representation of an earth model of one or more wells; and displaying one or more knowledge attachment symbols on the three-dimensional representation, wherein each knowledge attachment symbol is configured to display drilling operations data associated with the knowledge attachment symbol in response to user input.

20. The carrier medium of claim 19, wherein each knowledge attachment symbol is attached to a feature in a wellbore trajectory of the earth model in the three-dimensional representation.

* * * * *